United States Patent [19]

White

[11] Patent Number: 4,778,638

[45] Date of Patent: Oct. 18, 1988

[54] METHOD OF MAKING BALLISTIC HELMET

[75] Inventor: Milton R. White, Carbondale, Pa.

[73] Assignee: Gentex Corporation, Carbondale, Pa.

[21] Appl. No.: 925,083

[22] Filed: Oct. 30, 1986

[51] Int. Cl.$^4$ .................. B29C 65/70; B29D 9/00; B32B 27/00

[52] U.S. Cl. .......................... 264/152; 2/6; 2/412; 83/29; 83/925 CC; 156/224; 264/103; 264/153; 264/160; 264/258

[58] Field of Search ............ 2/6, 412; 83/29, 925 CC; 264/103, 152, 153, 160, 258; 156/224

[56] References Cited

U.S. PATENT DOCUMENTS

| | | | |
|---|---|---|---|
| 1,849,779 | 3/1932 | Zimmerman | 83/46 |
| 2,532,442 | 12/1950 | Daly | 2/412 |
| 2,610,322 | 9/1952 | Daly | 2/412 |
| 2,956,916 | 10/1960 | Voss et al. | 2/412 |
| 3,582,990 | 6/1971 | Frieder | 2/412 |
| 4,596,056 | 6/1986 | Grick | 2/412 |

FOREIGN PATENT DOCUMENTS 546000  6/1942  United Kingdom ............ 83/29

Primary Examiner—James Lowe
Attorney, Agent, or Firm—Shenier & O'Connor

[57] ABSTRACT

A method of making a ballistic helmet and a helmet made by the method in which each of the plies making up the body is formed from a hexagonal blank cut from ballistic cloth and provided with slits extending from the apices thereof toward the center to form a central area and segments extending from the central area. As the blanks are laid up in a mold cavity the segments overlap to provide first portions which overlap and second portions which do not. As successive blanks are laid up they are rotated slightly to stagger the portions of adjacent plies. As the laying up operation proceeds, progressively smaller blanks are laid up between adjacent relatively larger blanks.

5 Claims, 3 Drawing Sheets

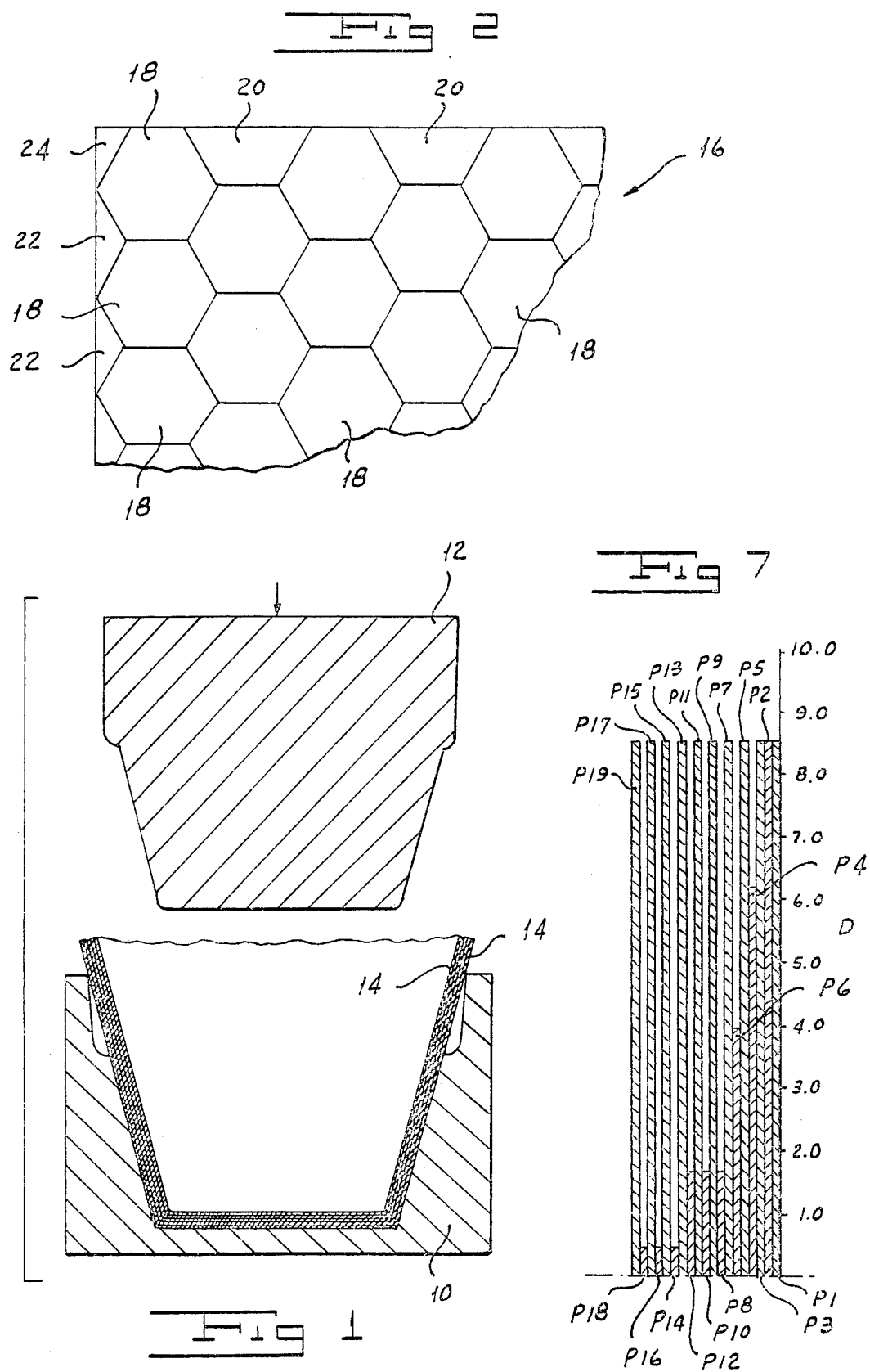

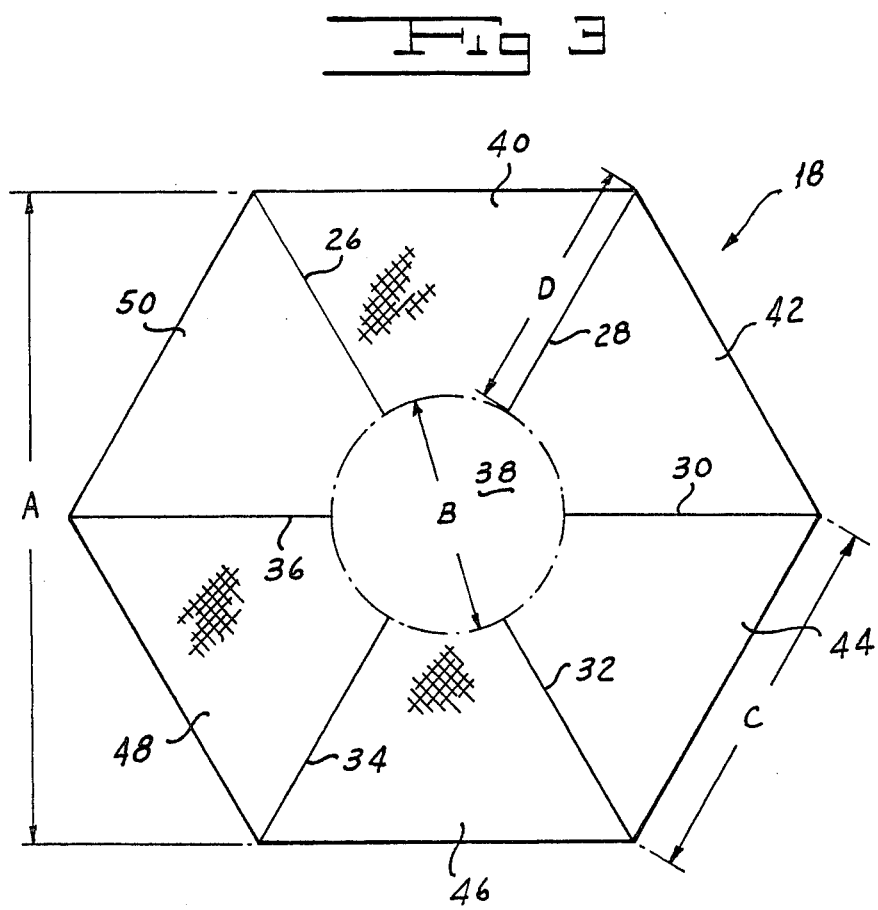
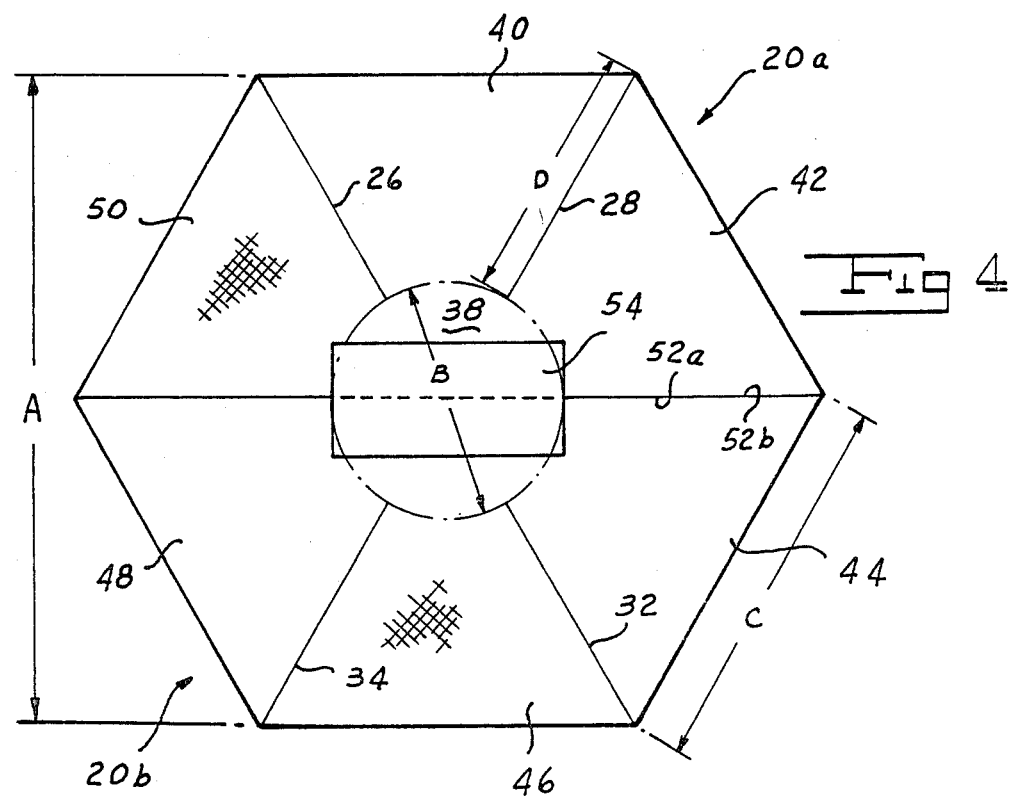

METHOD OF MAKING BALLISTIC HELMET

FIELD OF THE INVENTION

The invention is in the field of ballistic helmets and more particularly relates to an improved method of making helmets which makes most efficient use of the base ballistic material.

BACKGROUND OF THE INVENTION

Ballistic helmets are well known in the prior art for use by perons to protect them against serious injury from shrapnel and other missiles. Most modern ballistic helmets are made from a plurality of plies of ballistic material which are laid up in a mold and shaped to the configuration of the helmet.

A material which is eminently suited for use in making ballistic helmets is one which is made from one of the "aramids" which include aromatic polymide resins developed by E. I. du Pont de Nemours and Company and sold under the trademarks "Kevlar" and "Nomex". This material is relatively expensive. In addition, a considerable quantity of material is used in making up a helmet shell owing to the fact that a relatively large number of plies are required to produce a helmet affording the desired degree of protection. It will be apparent that the most efficient use of the available materials in making up the individual plies is highly desirable.

Generally speaking, two methods are known in the prior art for forming blanks from which the individual plies of the helmet body can be made. In the first of these methods which is exemplified by the disclosure of Daly Pat. No. 2,532, 442, individual unitary blanks are custom cut from the ballistic material prior to being laid up in the forming mold. While this method results in a high quality method having good ballistic properties, it does not make efficient use of the basic material, much of which is wasted in the custom cutting process. In the second method which is exemplified by Grick Pat. No. 4,596,056, a plurality of individual pieces are joined together by any suitable means to form the blank which is laid up into the mold. While this method permits a more efficient use of the available base material it is relatively complicated and time consuming. In addition, under certain circumstances the pieced up plies have not met customer specifications.

SUMMARY OF THE INVENTION

One object of my invention is to provide an improved method of making ballistic helmets.

Another object of my invention is to provide a ballistic helmet made by my improved method.

Still another object of my invention is to provide a method of making a ballistic helmet which makes most efficient use of the base material.

A still further object of my invention is to provide an improved method of making ballistic helmets which is rapid and expeditious.

Yet another object of my invention is to provide an improved method of making a ballistic helmet which makes efficient use of the base material while at the same time satisfying all of the customer's specifications.

A still further object of my invention is to provide an improved method of making ballistic helmets without sacrificing any degree of protection afforded by the helmet.

Other and further objects of my invention will appear from the following description.

BRIEF DESCRIPTION OF THE DRAWINGS

In the accompanying drawings to which reference is made in the instant specification and which are to be read in conjunction therewith and in which like reference characters are employed to indicate like parts in the various views:

FIG. 1 is a schematic view of a mold used in my improved method of making ballistic helmets.

FIG. 2 is a fragmentary view of a sheet of the base ballistic material illustrating the manner in which I cut the ply blanks.

FIG. 3 is a plan view of one form of ply blank which I may employ in my improved method of making ballistic helmets.

FIG. 4 is a plan view of an alternate form of ply blank which I may employ in my improved method of making ballistic helmets.

FIG. 7 is a fragmentary partially schematic view illustrating the laid up assembly of plies of one form of ballistic helmet made by my improved method of forming ballistic helmets.

DESCRIPTION OF THE PREFERRED EMBODIMENT

Figure 5:
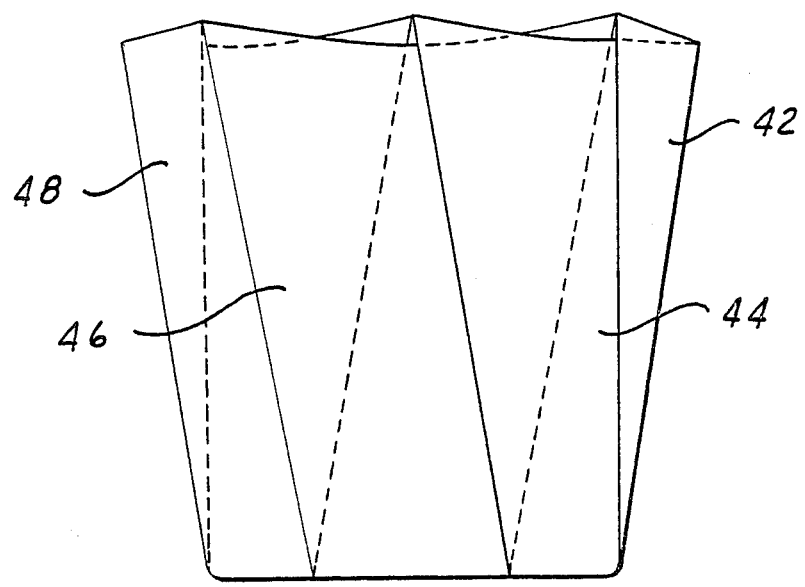
FIG. 5 is an elevation of a configuration of a blank after it has been formed in the mold of FIG. 1 in the practice of my improved method of making ballistic helmets.

Referring now to the drawing, as will be apparent from the description hereinbelow, in making a ballistic helmet body pursuant to my improved method, I lay up a plurality of superposed plies 14 in the cavity of a first die 10. When a predetermined number of plies have been laid up, the complementary die member 12 is moved under pressure into the cavity of the die 10 to form the plies to the shape of the helmet body. This operation of moving the dies 10 and 12 into cooperative relationship may be carried out one or more times in the course of formation of a complete helmet body.

In practice of my method of making ballistic helmets, I make optimum use of the base ballistic fabric. For example, with an available sheet, indicated generally by the reference character 16, of a fabric made from a suitable material, such for example as "Kevlar", I cut the individual blanks 18 from the sheet. I have discovered that a hexagonal shape of blank, both is a very nearly ideal shape for forming a helmet ply and also permits of the most efficient use of the material of the sheet 16.

It will be noted that in the course of cutting the sheet to form the blanks 18 along one edge thereof, I leave remnant pieces 20 which are in the form of a hemihexagon. Along the other edge of the sheet 16 I leave remnant pieces 22 and 24.

In adapting a blank 18 to serve as a ply of a ballistic helmet, I cut the blank 18 along lines 26, 28, 30, 32, 34 and 36 extending from the apices of the hexagon inwardly toward the center thereof. Each of the cuts extends for a distance D from an apex toward the center of the blank to result in a generally circular center portion 38 having a diameter B and segments 40, 42, 44, 46, 48 and 50 extending outwardly from the center portion 38. I select the dimensions A, which is the distance between a pair of parallel sides of the hexagon, and C, which is the length of one of the hexagon sides, in accordance with the size of the ply at that particular location in the helmet body.

In the practice of my method, I am also able to make full use of the remnant pieces 20 and some use of the remnants 22 and 24. As can be seen by reference to FIG. 4, a pair of remnants, 20a and 20b, may be placed with their longest sides in abutting relationship to form a full hexagon. With the parts in this position, a piece 54 of ballistic material cut from one of the remnants 22 and 24, for example, is secured to the two remnants 20a and 20b by any suitable means, such for example by ultrasonic welding. It will readily be appreciated that the piece 54 has a length which is substantially equal to the diameter B and is placed on the two remnants, 20a and 20b so that it extends over the full length of the diameter B before being welded in place. When it has been welded in place, the resulting blank has the same general configuration as does the blank shown in FIG. 3.

While a helmet shell made entirely of the blanks of the type shown in FIG. 4 might not be acceptable to certain users, the helmet incorporating a minimum number such blanks would be acceptable.

Figure 6:
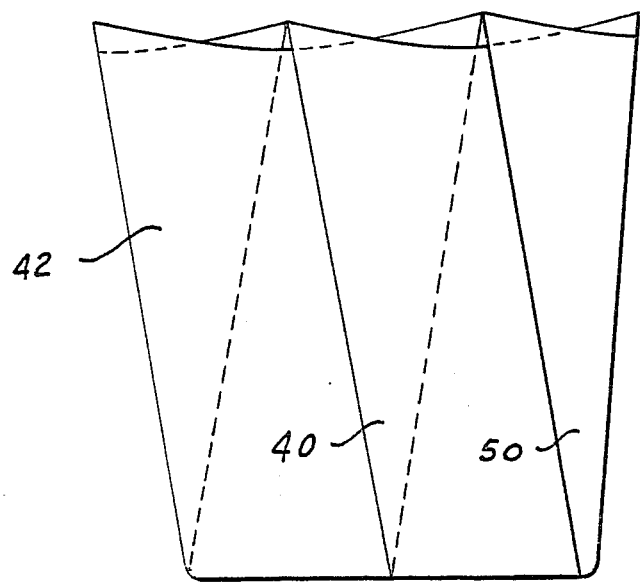
FIG. 6 is an elevation of the blank of FIG. 5 rotated through approximately 60° about the vertical axis thereof.

Referring now to FIGS. 5 and 6, I have shown the configuration of a blank after having been laid up in the mold member 10. In this condition of a blank, it will readily be seen that adjacent segments 40, 42, 44, 46 and 48 overlap each other with, for example, the segment 44 overlapping the segment 46, the segment 46 overlapping segment 48, and so forth. The amount of overlap is such that each blank or ply in this condition includes first portions which are overlapped so as to be of double thickness and second portions which are not overlapped so as to be of only single thickness. Owing to that fact, I rotate successive blanks or plies as they are laid up in the mold so as to ensure that the second unlapped portions of one ply are covered by first or overlapped portions of other plies. More specifically, I rotate each successive layer through such a distance that the fourth layer registers with the first.

Before laying up the various plies in the mold, I calculate the sizes of the various plies at various locations necessary to give the required thickness of ballistic material at that location in the finished helmet. In performing this calculation a series of circles were struck at different distances from a vertical center line on the top of the crown of a finished helmet having the desired configuration. Next, a calculation was made as to what the needs would be in perimeter inches at that particular area of the helmet to give the desired material thickness.

It will readily be appreciated that the number of plies, the dimensions of the various plies and the manner of laying the plies up varies with the type and size of the helmet. By way of example, in the table below I have outlined the dimensions of nineteen plies which required to make up one configuration of helmet or helmet preform.

| PLY NO. | A | B | C | D |
|---|---|---|---|---|
| | (I N C H E S) | | | |
| 1 | 20 | 6 | 11.548 | 8.548 |
| 2 | 20 | 6 | 11.548 | 8.548 |
| 3 | 20 | 6 | 11.548 | 8.548 |
| 4 | 16 | 6 | 9.237 | 6.237 |
| 5 | 20 | 6 | 11.548 | 8.548 |
| 6 | 12 | 6 | 6.928 | 3.928 |

-continued

| PLY NO. | A | B | C | D |
|---|---|---|---|---|
| | (I N C H E S) | | | |
| 7 | 20 | 6 | 11.548 | 8.548 |
| 8 | 8 | 6 | 4.619 | 1.619 |
| *9 | 20 | 6 | 11.548 | 8.548 |
| 10 | 8 | 6 | 4.619 | 1.619 |
| *11 | 20 | 6 | 11.548 | 8.548 |
| 12 | 8 | 6 | 4.619 | 1.619 |
| 13 | 20 | 6 | 11.548 | 8.548 |
| 14 | 6 | 6 | 3.464 | 0.464 |
| 15 | 20 | 6 | 11.548 | 8.548 |
| 16 | 6 | 6 | 3.464 | 0.464 |
| 17 | 20 | 6 | 11.548 | 8.548 |
| 18 | 6 | 6 | 3.464 | 0.464 |
| 19 | 20 | 6 | 11.548 | 8.548 |

*May be according to FIG. 4.

From the discussion thus far, it will readily be apparent that my improved method is especially adapted for use where kits containing the blanks necessary to make up a particular model and size of helmet are supplied to the user. For example, where a helmet preform of the type adapted to be made up with the blanks of Table 1 is to be made, the operator is supplied with a kit containing those blanks in the correct number and sequence. Multiple kits are stacked with a separator of any suitable type between each kit.

In practice of my improved method of making a ballistic helmet preform, each of the plies is formed in the manner described hereinabove from ballistic cloth which preferably is an aramid resin readily available from a number of suppliers under different trade names. In practicing my method, the material of which the plies are made is coated on both sides with equal amounts of laminating resin which may, for example, be a catalyzed system composed of 50% phenol formaldehyde and 50% polyvinyl butyral resins.

By way of example, in the formation of a preform according to Table I with molding apparatus illustrated in FIG. 1, to produce the lay-up illustrated in FIG. 7, the operator first folds the first blank or outer disc pinwheel generally to the configuration of FIGS. 5 and 6, taking care that all flaps or overlapping portions of the folds run in the same direction. The folded blank is then placed in the mold member 10. Next, the blank which is to form ply 2 is folded, making sure that all the flaps run in the same direction and this folded blank is placed in the mold member 10 over the first blank with the second and succeeding plies being rotated a sufficient amount relative to the first so that every fourth blank registers. The next six plies up to ply 8 are positioned in the mold and the mold member 12 is moved into the cavity of the mold member 10. After the next four plies are placed in the mold cavity in the manner described, the press is again operated. The next four plies are inserted in place and the press is operated. Then the last three plies are positioned and the mold plug 12 is moved into the cavity of the member 10. When that has been done the completed preform is sealed around the edges thereof with a heat gun. The completed preform may then be removed from the mold member 10.

It will be seen that I have accomplished the objects of my invention. I have provided an improved method of making ballistic helmets and a ballistic method made thereby. My method makes most efficient use of the base material of which the helmet is formed. My method is rapid and expeditious. My method makes efficient use of the base material while at the same time satisfying all of the user's specifications. My method makes most efficient use of the base material without sacrificing any degree of protection to the wearer.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of making a ballistic helmet body from ballistic sheet material including the steps of cutting a plurality of blanks of hexagonal shape from said sheet material, slitting each of said hexagonal blanks along lines extending for a predetermined distance from the apices thereof toward the center thereof to form a generally circular central area surrounded by a plurality of segments, laying up said blanks in a mold cavity with adjacent segments of each blank overlapping and subjecting said laid up blanks to pressure to form said body, each of said laid up blanks having first portions which are overlapped and second portions which are not overlapped, said laying up step including the step of rotating successive blanks as they are laid up to stagger the portions of one blank with respect to the portions of an adjacent blank, said cutting step comprising cutting a plurality of first relatively large blanks and cutting a plurality of second progressively smaller blanks, said laying up step comprising laying up second blanks of progressively smaller size between adjacent first blanks as said laying up operation progresses.

2. A method as in claim 1 in which said slitting operation is carried out so that the central areas of said blanks are all of the same size.

3. A method of making a ballistic helmet body from ballistic sheet material including the steps of cutting a plurality of blanks of hexagonal shape from said sheet material, slitting each of said hexagonal blanks along lines extending for a predetermined distance from the apices thereof toward the center thereof to form a generally circular central area surrounded by a plurality of segments, laying up said blanks in a mold cavity with adjacent segments of each blank overlapping and subjecting said laid up blanks to pressure to form said body, said cutting step comprising cutting a plurality of relatively large first blanks and cutting a plurality of progressively smaller second blanks, said laying up step comprising laying up second blanks of progressively smaller size between adjacent first blanks as said laying up operation progresses.

4. A method of making a ballistic helmet body from ballistic sheet material including the steps of cutting a plurality of blanks of hexagonal shape from said sheet material, slitting each of said hexagonal blanks along lines extending for a predetermined distance from the apices thereof toward the center thereof to form a generally circular central area surrounded by a plurality of segments, laying up said blanks in a mold cavity with each segment of a blank partially overlapping an adjacent segment to provide each laid up blank with overlapped portions of double thickness and other portions of single thickness and subjecting said laid up blanks to pressure to form said body, said laying up step including the step of rotating successive plies to ensure that said other single thickness portions of each ply are covered by double thickness overlapped portions of other plies.

5. A method as in claim 4 in which said rotating step comprises rotating said successive plies to such an extent that the portions of the fourth ply register with those of the first.

* * * * *